UNITED STATES PATENT OFFICE.

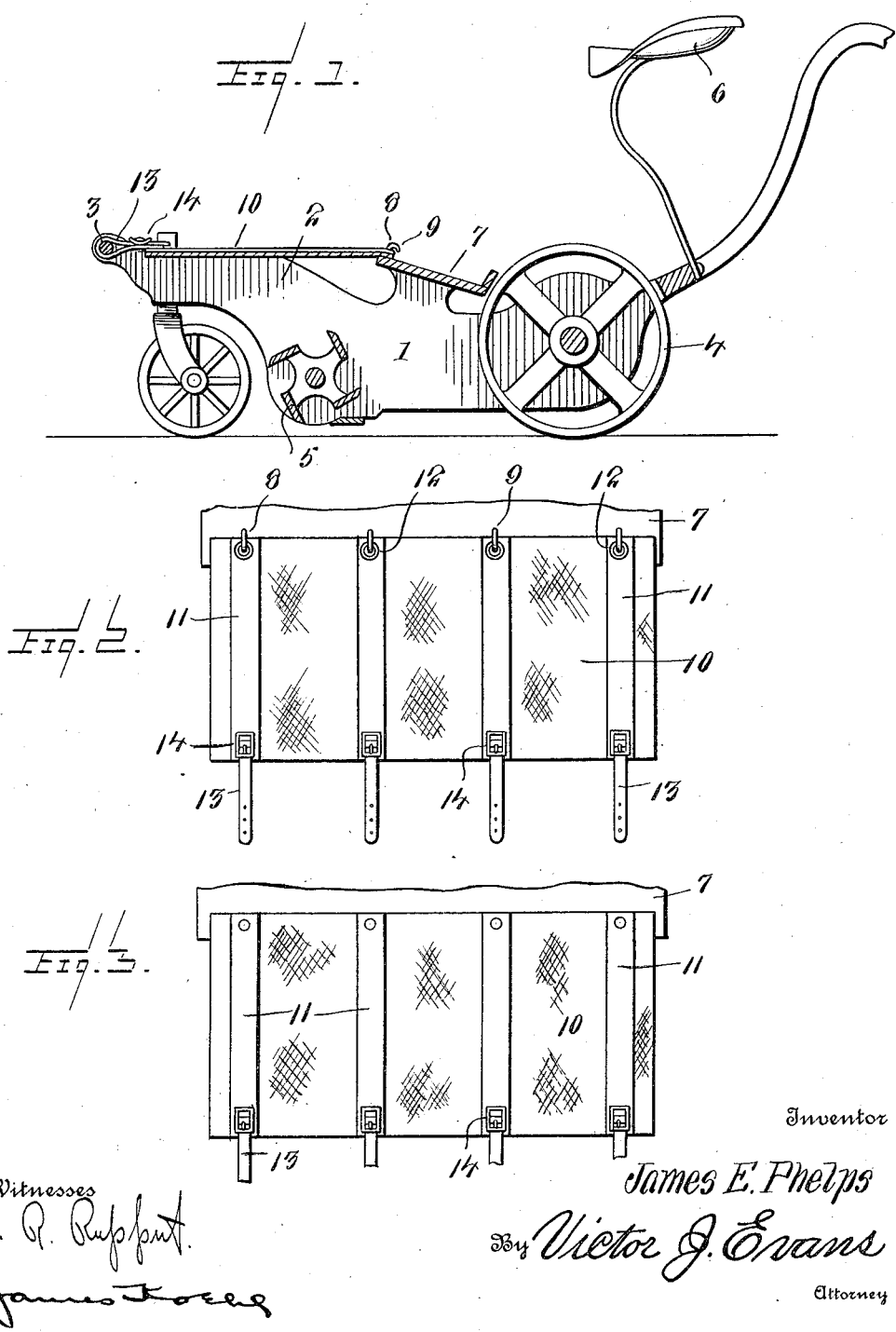

JAMES E. PHELPS, OF NEW PRESTON, CONNECTICUT.

DUST-APRON FOR HORSE-MOWERS.

1,033,731. Specification of Letters Patent. Patented July 23, 1912.

Application filed October 25, 1911. Serial No. 656,564.

*To all whom it may concern:*

Be it known that I, JAMES E. PHELPS, a citizen of the United States, residing at New Preston, in the county of Litchfield and State of Connecticut, have invented new and useful Improvements in Dust-Aprons for Horse-Mowers, of which the following is a specification.

This invention relates to dust aprons for horse mowers or the like, and it has for an object to provide means located in front of the driver's seat and above the plane of the cutting knives for positively shielding the eyes of the driver from the dust and flying grass.

Another object of the invention is to provide a shield which can be readily removed from or applied to the mower.

In the drawing, forming a portion of this specification and in which like numerals of reference indicate similar parts in the several views:—Figure 1 is a transverse section through the mower showing the application of the apron thereto. Fig. 2 is a plan view of the apron. Fig. 3 is a view similar to Fig. 2 showing a slightly modified form of apron.

The horse mower 1 shown herein is of a construction which includes a frame having the side bars 2 which are connected at their front ends by a cross bar 3. The rollers 4 support the frame to the cutting knives 5 and the driver's seat 6. A foot-board 7 is carried by the frame and is located forwardly of the rollers 4 and above the plane of the cutting knives 5.

In the preferred embodiment of the invention the foot-board 7 carries a longitudinal series of hooks 8 having upwardly and rearwardly extending tongues 9. The apron or shield 10 is preferably constructed from a single length of canvas of elongated rectangular configuration and reinforced by a plurality of relatively spaced strips. Along one of its longitudinal edges, the apron is provided with a series of metal eyelets 12 which are adapted to engage the tongues 9 of the hook on the foot-board 7. The opposite longitudinal edge of the apron is provided with straps 13. These straps are adapted to be extended beneath the front connecting rod 3 of the mower frame and they may then be extended over the top of the rod to be engaged in the buckles 14 at the inner ends of the straps. This construction is such that the apron can be readily applied to or removed from the mower. When the apron is in its operative position above the cutting blades of the mower it forms a shield or guard to prevent the flying dust, grass or the like from going into the face of the operator.

In the modified form of the apron shown in Fig. 3, I omit the eyelets described in the preferred form of the invention and rely upon such fastening devices as nails, tacks or the like for securing the apron to the foot-board of the mower.

I claim:

The combination with a lawn mower including a foot board provided with a longitudinal series of hooks, a rod located forwardly of the foot board and cutting knives disposed beneath the plane of the foot board, of an elongated rectangular shield made of flexible material, a plurality of relatively spaced reinforcing strips secured to the upper side of the shield and extended transversely thereof, eyelets passing through the inner edge of the reinforcing strips and through the shield for the reception of said hook, and straps and buckles secured to the opposite ends of the reinforcing strips for detachably securing the forward edge of the shield to the rod.

In testimony whereof I affix my signature in presence of two witnesses.

JAMES E. PHELPS.

Witnesses:
WM. H. DOUGAL,
NANCY E. DOUGAL.

Copies of this patent may be obtained for five cents each, by addressing the "Commissioner of Patents, Washington, D. C."